(12) United States Patent
de Jong et al.

(10) Patent No.: US 9,971,103 B2
(45) Date of Patent: May 15, 2018

(54) FIBER OPTIC CONNECTOR WITH SLIDER ASSEMBLY FOR PUSH-PULL LATCHING

(71) Applicant: Corning Optical Communications LLC, Hickory, NC (US)

(72) Inventors: Michael de Jong, Colleyville, TX (US); Daniel Leyva, Jr., Arlington, TX (US); David Wayne Meek, Fort Worth, TX (US)

(73) Assignee: Corning Optical Communications LLC, Hickory, NC (US)

( * ) Notice: Subject to any disclaimer, the term of this patent is extended or adjusted under 35 U.S.C. 154(b) by 0 days. days.

(21) Appl. No.: 15/441,448

(22) Filed: Feb. 24, 2017

(65) Prior Publication Data

US 2017/0160496 A1   Jun. 8, 2017

Related U.S. Application Data

(63) Continuation of application No. PCT/US2015/052603, filed on Sep. 28, 2015.
(60) Provisional application No. 62/058,180, filed on Oct. 1, 2014.

(51) Int. Cl.
*G02B 6/38* (2006.01)
(52) U.S. Cl.
CPC ........... *G02B 6/3893* (2013.01); *G02B 6/387* (2013.01); *G02B 6/3821* (2013.01); *G02B 6/3825* (2013.01); *G02B 6/3885* (2013.01)
(58) Field of Classification Search
CPC .... G02B 6/3893; G02B 6/387; G02B 6/3825; G02B 6/3821; G02B 6/3885
See application file for complete search history.

(56) References Cited

U.S. PATENT DOCUMENTS

| 6,893,165 | B2 | 5/2005 | Ngo |
| 8,956,056 | B2 * | 2/2015 | Katagiyama ......... G02B 6/3885 |
| | | | 385/72 |
| 2005/0201690 | A1 | 9/2005 | Taira et al. |
| 2011/0081798 | A1 * | 4/2011 | Koreeda ............... G02B 6/3825 |
| | | | 439/374 |

(Continued)

FOREIGN PATENT DOCUMENTS

JP    201061010 A    3/2010

OTHER PUBLICATIONS

PCT International Search Report, PCT/US2015/052603, dated Sep. 28, 2015, 5 Pages.

*Primary Examiner* — Ellen Kim
(74) *Attorney, Agent, or Firm* — Adam R. Weeks

(57) ABSTRACT

A fiber optic connector includes a ferrule, a housing received over the ferrule, and a slider assembly mounted to the housing. The housing includes left and right sides each having a latch receptacle for receiving at least a portion of an adapter latch. The slider assembly includes a first unit movable relative to the housing between a forward position and a rearward position, wherein the first unit at least partially obstructs the latch receptacles when the first unit is in its forward position, and each of the latch receptacles is at least partially unobstructed by (e.g., substantially not obstructed by) the first unit when the first unit is in its rearward position. The slider assembly also includes a second unit movable relative to the housing between a forward position and a rearward position.

14 Claims, 13 Drawing Sheets

(56) References Cited

U.S. PATENT DOCUMENTS

2012/0057826 A1 3/2012 Katoh
2012/0057831 A1 3/2012 Taira et al.

* cited by examiner

FIBER OPTIC CONNECTOR WITH SLIDER ASSEMBLY FOR PUSH-PULL LATCHING

PRIORITY

This application is a continuation of PCT/US2015/052603, filed on Sep. 28, 2015, which claims the benefit of priority of U.S. Provisional Application Ser. No. 62/058,180, filed on Oct. 1, 2014. The content of these applications is relied upon and incorporated herein by reference in its entirety.

BACKGROUND

This disclosure relates generally to connectors for optical fibers, and more particularly to fiber optic connectors for push-pull latching.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, optical connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable" connectors).

Many different types of optical connectors exist. In environments that require high density interconnects and/or high bandwidth, such as data centers, multi-fiber optical connectors are the most widely used. One example is the multi-fiber push on (MPO) connector, which includes a push-pull latch, incorporates a mechanical transfer (MT) ferrule, and is standardized according to TOA-604-5 and IEC 61754-7. These connectors can achieve a very high density of optical fibers, which reduces the amount of hardware, space, and effort to establish a large number of interconnects.

To engage a standard MPO connector in a standard adapter, an inner housing of the connector must be pushed in order to allow an outer, one-piece slider of the connector to move rearward against its springs so that latches of the adapter insert into latch receptacles of the housing. If the one-piece slider is accidentally pushed while trying to engage the connector in the adapter, the one-piece slider butts against the latches and prevents insertion of the latches into the latch receptacles of the housing, which prevents proper engagement (e.g., latching) between the connector and the adapter.

SUMMARY

Embodiments of fiber optic connectors configured to be inserted into an adapter that includes adapter latches are disclosed below. According to one embodiment, a fiber optic connector includes a ferrule, a housing received over the ferrule, and a slider assembly mounted to the housing. The ferrule includes a front end face and a plurality of bores extending into the ferrule from the front end face. The housing includes left and right sides each having a latch receptacle for receiving at least a portion of one of the adapter latches. The slider assembly includes first and second units between which there may be relative movement. The first unit is movable relative to the housing between a forward position and a rearward position, wherein the first unit at least partially obstructs the latch receptacles when the first unit is in its forward position, and each of the latch receptacles is at least partially unobstructed by (e.g., substantially not obstructed by) the first unit when the first unit is in its rearward position. The second unit is also movable relative to the housing between a forward position and rearward position. The slider assembly is also configured so that the first unit is movable relative to both the housing and the second unit, such as when the second unit remains in its forward position.

In one embodiment, the first unit is an inner unit and the second unit is an outer unit. When the inner unit is its rearward position so that the latch receptacles are substantially unobstructed by the inner unit, the adapter latches may be received in or removed from the latch receptacles. When the latch receptacles are not in receipt of the adapter latches and the inner unit is in its forward position so that the latch receptacles are substantially obstructed by the inner unit, the adapter latches may not be received in the latch receptacles. When the latch receptacles are in receipt of the adapter latches and the inner unit is in its forward position so that the latch receptacles are substantially obstructed by the inner unit, the adapter latches may not be readily removed from the latch receptacles. The inner unit may be biased by one or more springs toward its forward position, and the slider assembly may be configured so that the inner unit carries the outer unit to its forward position. Regarding installation of the connector to an adapter that includes the adapter latches, the slider assembly may also be configured so that the inner unit may be reciprocated relative to the outer unit while the outer unit is being manually held in its forward position, so that the connector may be inserted into and latched to the adapter while the outer unit is being manually pushed into and held in its forward position.

Methods of at least partially assembling a fiber optic connector are also disclosed. The connector may be one of those mentioned above, for example. One embodiment of such a method involves movably mounting a slider assembly to a housing so that an inner unit of the slider assembly extends at least partially around the housing and an outer unit of the slider assembly extends at least partially around the inner unit. The movably mounting may be comprised of causing relative movement between the inner and outer units and the housing so that an outwardly extending protrusion of the housing extends outwardly at least partially into a hole in the inner unit, and part of the outer unit becomes at least partially captured rearwardly of the protrusion while the protrusion extends outwardly at least partially into the hole in the inner unit.

Additional features and advantages will be set forth in the detailed description which follows, and in part will be readily apparent to those skilled in the technical field of optical communications. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments. Features and attributes associated with any of the embodiments shown or described may be applied to other embodiments shown, described, or appreciated based on this disclosure.

FIG. 1 a schematic perspective view of an example of a fiber optic cable assembly that includes a fiber optic connector, in accordance with an embodiment of this disclosure;

FIG. 5 is also illustrative of a cross-sectional view of the housing taken in the opposite direction from line 9-9;

FIG. 6 is also illustrative of a cross-sectional view of the inner slider unit taken in the opposite direction from line 9-9;

FIG. 7 is also illustrative of a cross-sectional view of the outer slider unit taken in the opposite direction from line 9-9;

FIG. 9 is also illustrative of a cross-sectional view in the opposite direction from line 9-9;

FIG. 10 is also illustrative of a cross-sectional view in the opposite direction from line 10-10;

DETAILED DESCRIPTION

Various embodiments will be further clarified by examples in the description below. In general, the description relates to fiber optic connectors and cable assemblies incorporating such connectors. Some aspects of the connectors of this disclosure may be based on known connector designs, such as MPO and MTP connectors. An MTP connector is a particular type of MPO connector (MTP® is a trademark of US Conec Ltd.).

Figure 1:
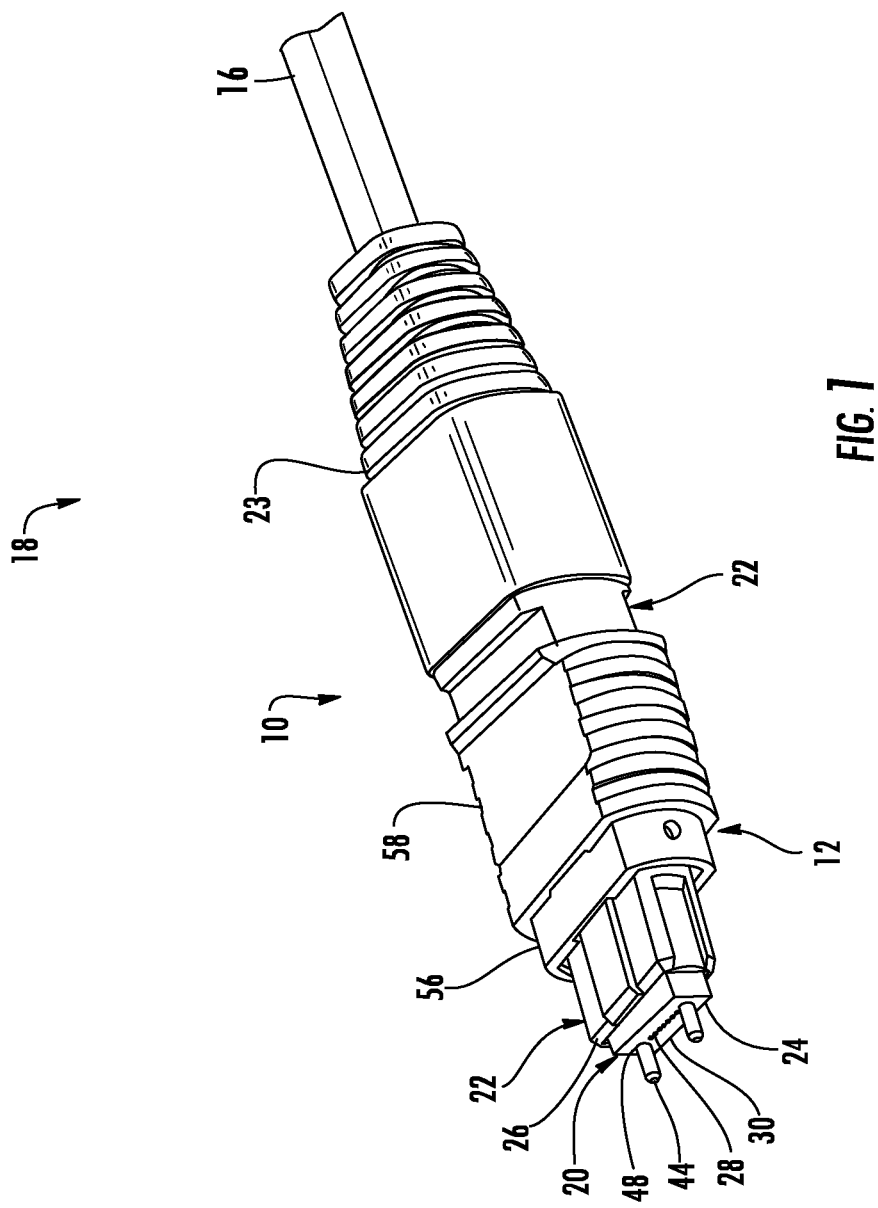
Figure 2:
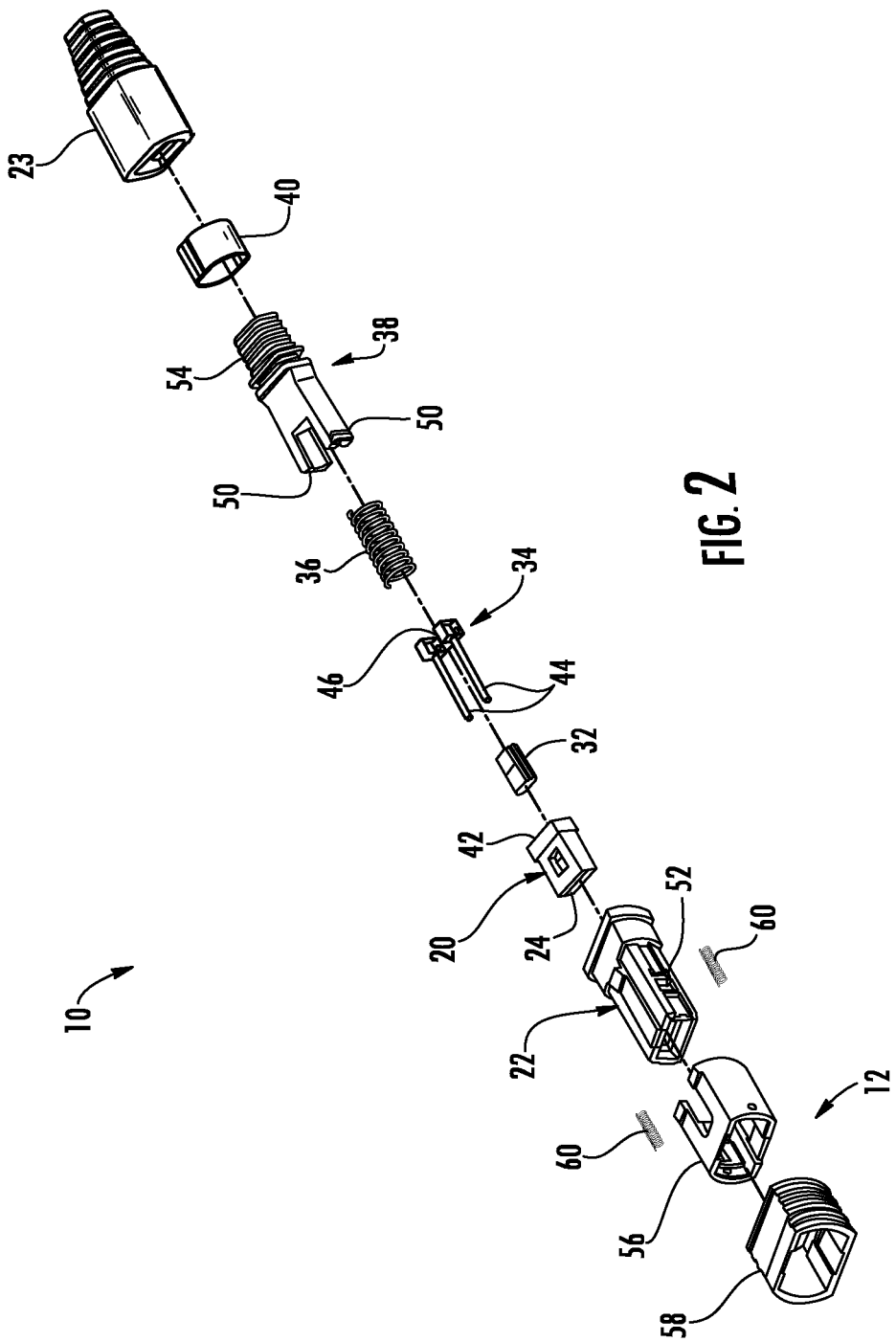
FIG. 2 is a schematic, exploded perspective view of the connector of FIG. 1.
Figure 11:
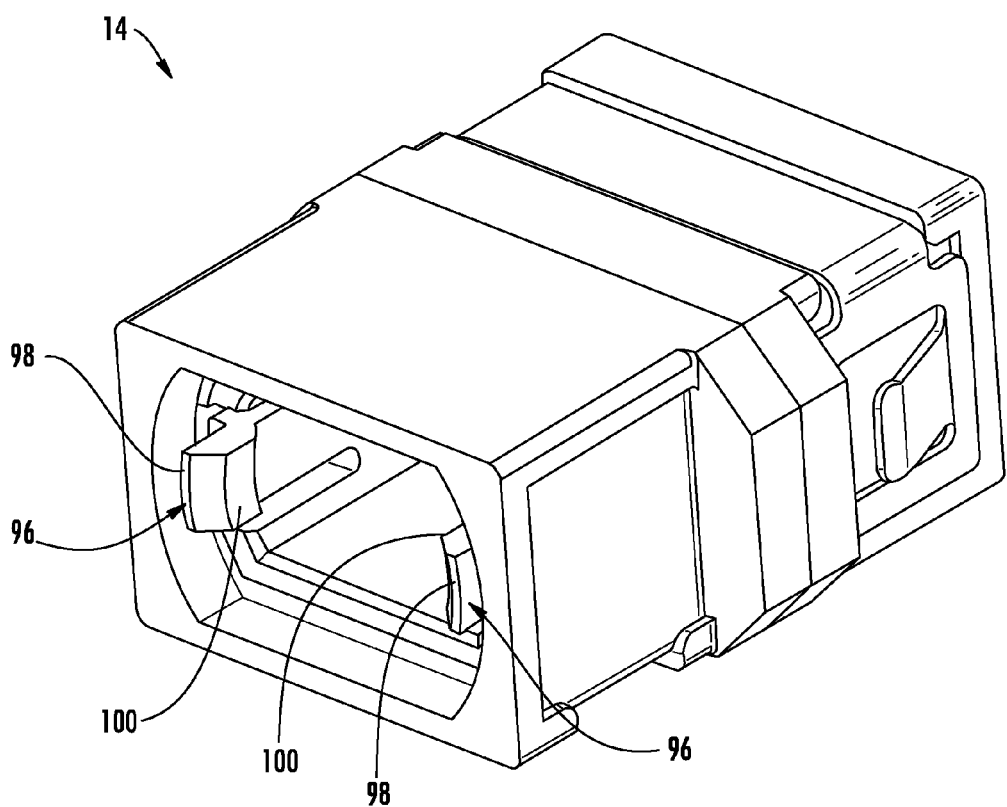
FIG. 11 is a perspective view of a conventional adapter.

FIGS. 1 and 2 illustrate a fiber optic connector 10 (also referred to as "optical connector" or simply "connector") in accordance with an embodiment of this disclosure. A brief overview of the connector 10 will be provided, followed by a more detailed discussion of a multi-part slider assembly 12 of the connector. As will be discussed in greater detail after the overview and in accordance with one aspect of this disclosure, the slider assembly 12 advantageously seeks to streamline proper engagement between the connector 10 and a receptacle that may be in the form of an adapter 14 (FIG. 11). In one example, except for the slider assembly 12, at least some of the components of the connector 10 may be conventional.

As shown in FIG. 1, the connector 10 may be installed on a fiber optic cable 16 ("cable") to form a fiber optic cable assembly 18. The connector 10 includes a ferrule 20, an inner housing 22 ("housing") received over the ferrule 20, the slider assembly 12 received over the housing 22, and a boot 23 received over the cable 16. The ferrule 20 is spring-biased within the housing 22 so that a front portion 24 of the ferrule 20 extends beyond a front end 26 of the housing 22. One or more optical fibers (not shown) carried by the cable 16 extend through one or more bores 28 in the ferrule 20 before terminating at or near a front end face 30 of the ferrule 20. The optical fibers are secured within the ferrule 20 using an adhesive material (e.g., epoxy) and can be presented for optical coupling with optical fibers of a mating component (e.g., another fiber optic connector; not shown) when the housing 20 is inserted into an adapter, receptacle, or the like.

As shown in FIG. 2, the connector 10 further includes a ferrule boot 32, guide pin assembly 34, spring 36, crimp body 38, and crimp ring 40. The ferrule boot 32 is received in a rear portion 42 of the ferrule 20 to help support the optical fibers extending to the ferrule bores 28 (FIG. 1). The guide pin assembly 34 includes a pair of guide pins 44 extending from a pin keeper 46. Features on the pin keeper 46 cooperate with features on the guide pins 44 to retain portions of the guide pins 44 within the pin keeper 46. When the connector 10 is assembled, the pin keeper 46 is positioned against a back surface of the ferrule 20, and the guide pins 44 extend through pin holes 48 (FIG. 1) provided in the ferrule 20 so as to project beyond the front end face 30. The presence of the guide pins 44 means that the connector 10 is in a male configuration; a female configuration would be when the guide pins 44 are not present.

Both the ferrule 20 and guide pin assembly 34 are biased to a forward position relative to the housing 22 by the spring 36. More specifically, the spring 36 is positioned between the pin keeper 46 and a portion of the crimp body 38. The crimp body 38 is inserted into the housing 22 when the connector 10 is assembled and includes latching arms 50 that engage receptacles in the housing. The spring 36 is compressed by this point and exerts a biasing force on the ferrule 20 via the pin keeper 46. The rear portion 42 of the ferrule defines a flange that interacts with a shoulder or stop formed within the housing 22 to retain the rear portion 42 within the housing 22.

In a manner not shown in the figures, aramid yarn or other strength members from the cable 16 are positioned over a rear end portion 54 of the crimp body 38 that projects rearwardly from the housing 22. The aramid yarn is secured to the end portion 54 by the crimp ring 40, which is slid over the end portion 54 and deformed after positioning the aramid yarn. The boot 23 covers this region, as shown in FIG. 1, and provides strain relief for the optical fibers by limiting the extent to which the connector 10 can bend relative to the cable 16. A user may grasp and push the boot 23 when inserting the connector 10 into an adapter 14 (FIG. 11), thereby allowing the housing 22 to be fully inserted for proper engagement/mating with the adapter, as will be discussed in greater detail below.

As shown in FIGS. 1-4, the slider assembly 12 includes at least first and second slider units 56, 58, and the slider units are movably mounted to the housing 22 for allowing selective relative movement between the slider units. The first slider unit 56 is an inner unit in the embodiment shown and is biased by one or more springs 60 (FIGS. 2 and 3) relative to the housing 22. The second slider unit 58 is an outer unit in the embodiment shown, and a user may grasp and pull the second slider unit when disengaging the connector 10 from an adapter 14 (FIG. 11). As will be discussed in greater detail below, by pulling the second slider unit 58, pull forces are transferred by way of the first slider unit 56 to the housing 22 (rather than the cable 16) to disengage the housing 22 from the adapter or receptacle. The first and second slider units 56, 58 will be referred to as inner and outer slide units in the remainder of the description.

Figure 3:
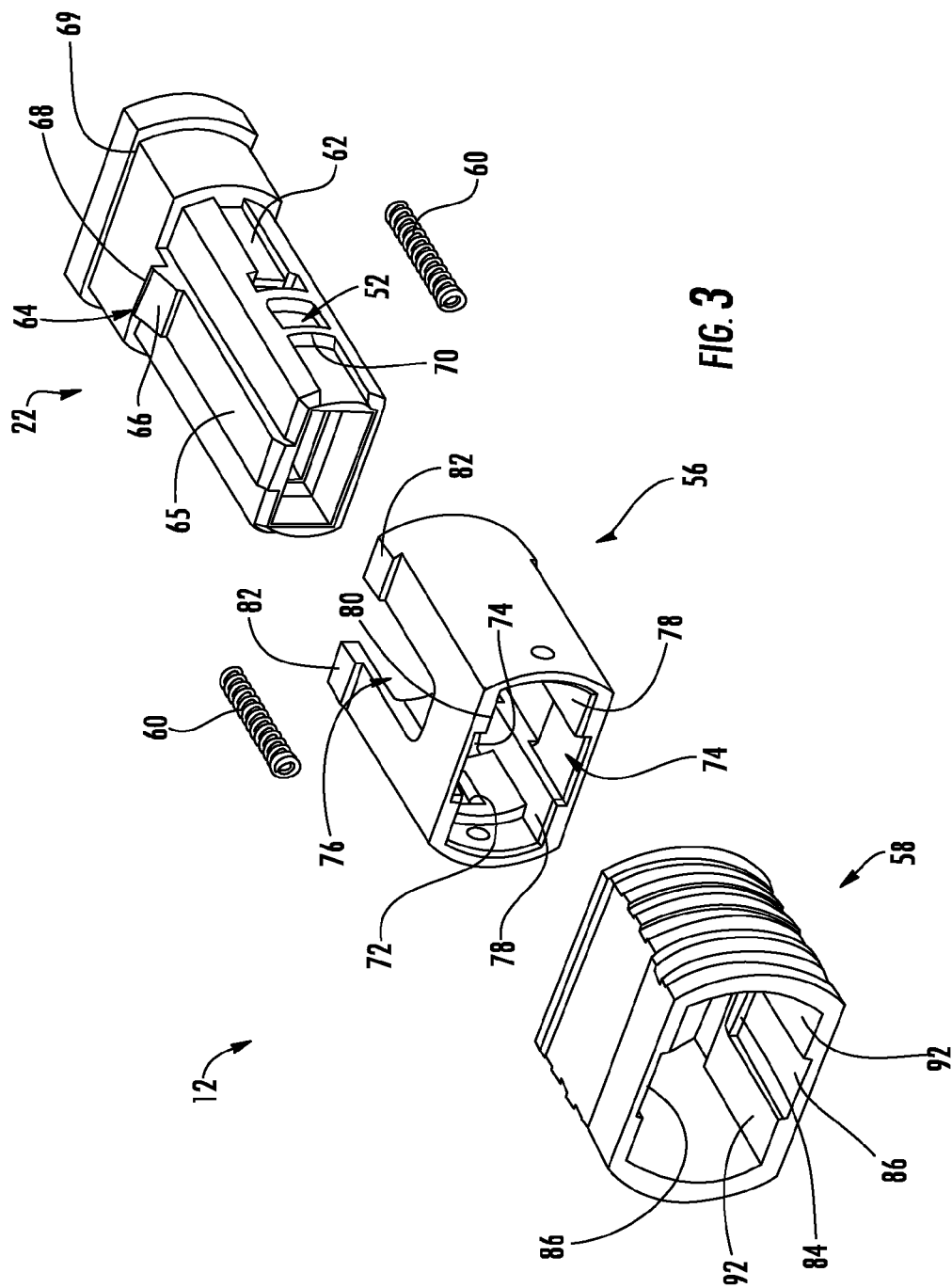
FIG. 3 is an exploded perspective view of a subcombination of the connector of FIG. 1, wherein the subcombination includes a multi-part slider assembly, housing, and other components of the connector.
Figure 5:
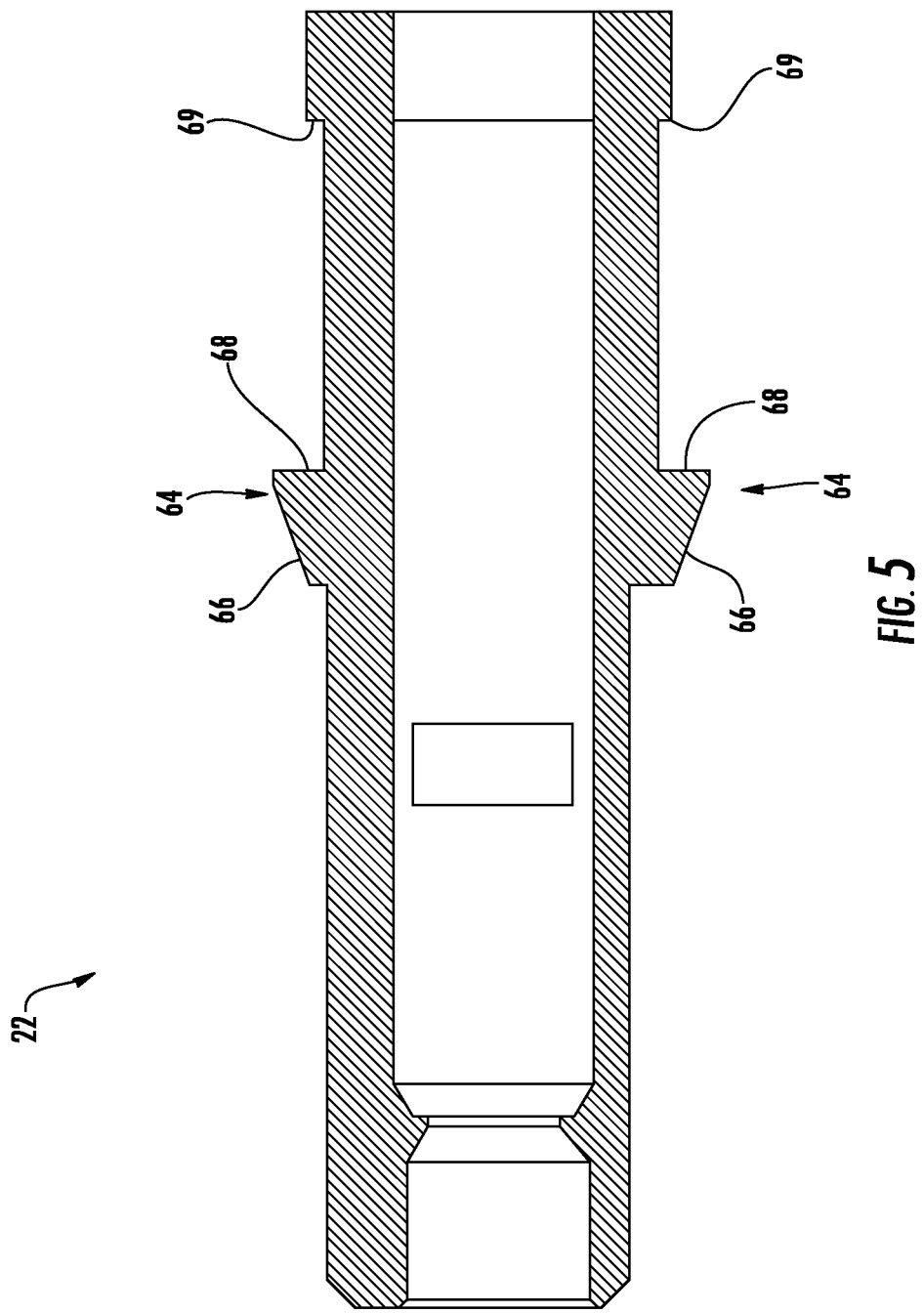
FIG. 5 is an isolated cross-sectional view of the housing of the subcombination of FIGS. 3 and 4, wherein the cross section is taken along line 9-9 of FIG. 4.

Examples of features of the housing 22 may be understood with reference to FIGS. 3 and 5. Each of the right and left sides of the housing 22 includes an outwardly open receptacle 62 (FIG. 3) for receiving a respective spring 60. Each of the top and bottom surfaces of the housing 22 includes a generally ramp-shaped protruding part, which may be referred to as a housing ramp protrusion 64, extending outwardly from proximate a rear end of a key 65. Each housing ramp protrusion 64 may include a housing inclined surface 66 and an upright surface, which may be referred to as housing forward shoulder 68. A rear, outwardly protruding protrusion or flange of the housing 22 includes upright surfaces, which may be referred to as housing rearward shoulders 69. Catch or latch receptacles 52 (e.g., holes) at each of the right and left sides of the housing 22 may be at least partially defined by generally wedge-shaped protruding parts, which may be referred to as catch wedge protrusions 70 (FIG. 3).

Figure 6:
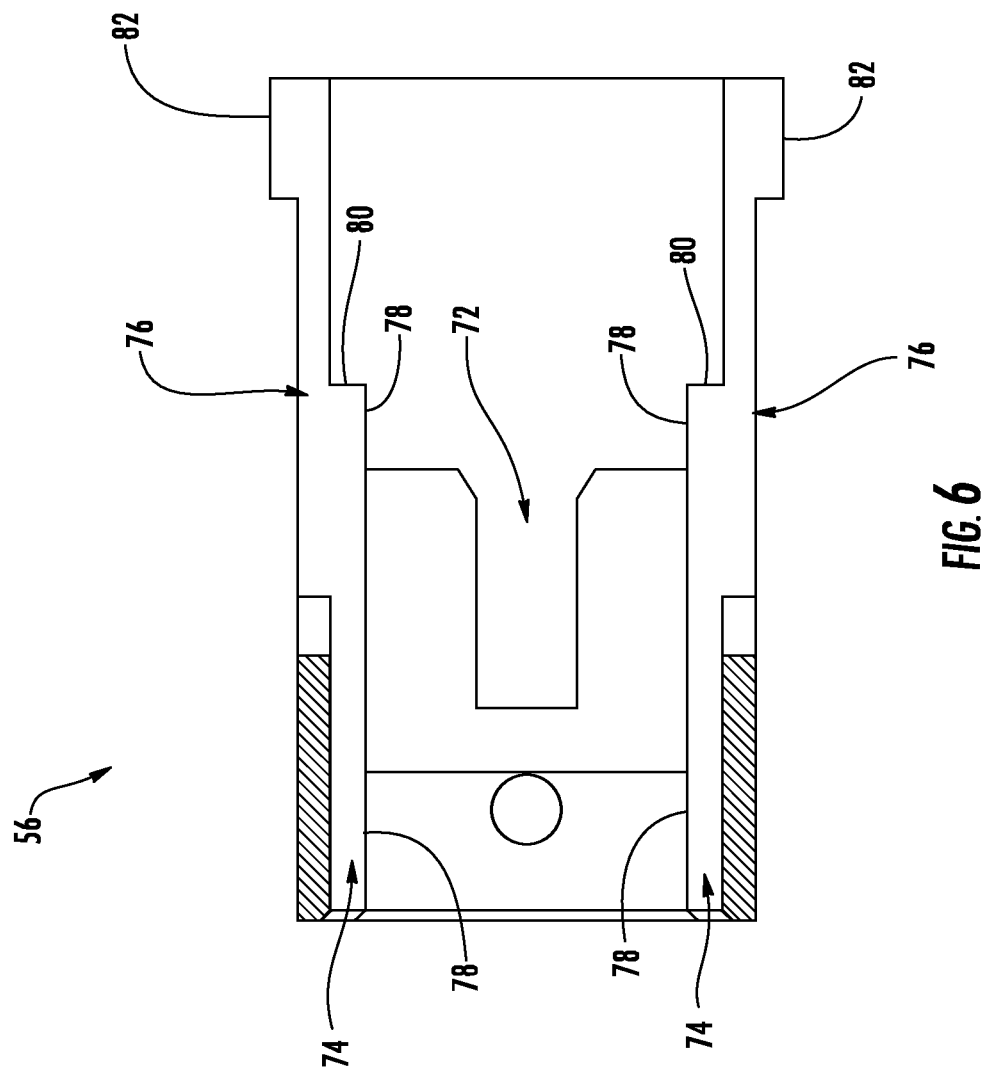
FIG. 6 is an isolated cross-sectional view of an inner slider unit of the slider assembly of the subcombination of FIGS. 3 and 4, wherein the cross section is taken along line 9-9 of FIG. 4.

Examples of features of the inner slider unit 56 may be understood with reference to FIGS. 3 and 6. Each of the right and left walls of the inner slider unit 56 includes an inwardly open receptacle 72 for receiving a respective spring 60. Each of the top and bottom walls of the inner slider unit 56 includes an inner unit keyway 74 extending forwardly from a rearwardly open hole 76 that extends through the subject wall. Each of the top and bottom walls of the inner slider unit 56 further includes inner unit guide surfaces 78 between which the inner unit keyways 74 are respectively positioned. Upright surfaces proximate the rear ends of the inner unit guide surfaces 78 may be referred to as inner unit shoulders 80. The inner slider unit 56 includes rear, outwardly protruding protrusions, which may be referred to as inner unit flanges 82.

Figure 7:
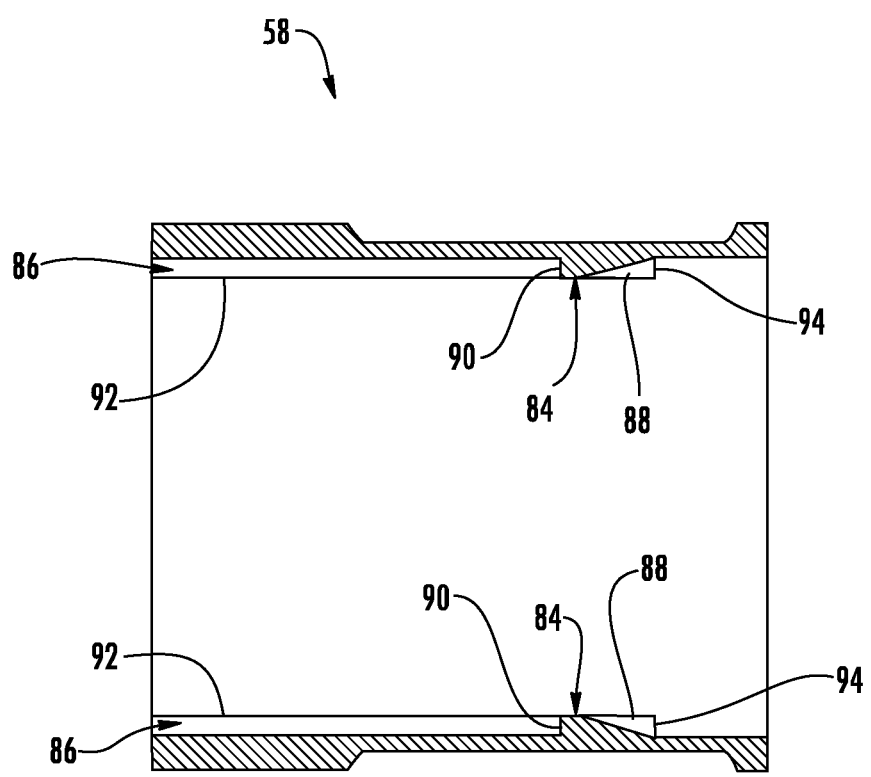
FIG. 7 is an isolated cross-sectional view of an outer slider unit of the slider assembly of the subcombination of FIGS. 3 and 4, wherein the cross section is taken along line 9-9 of FIG. 4.
Figure 8:
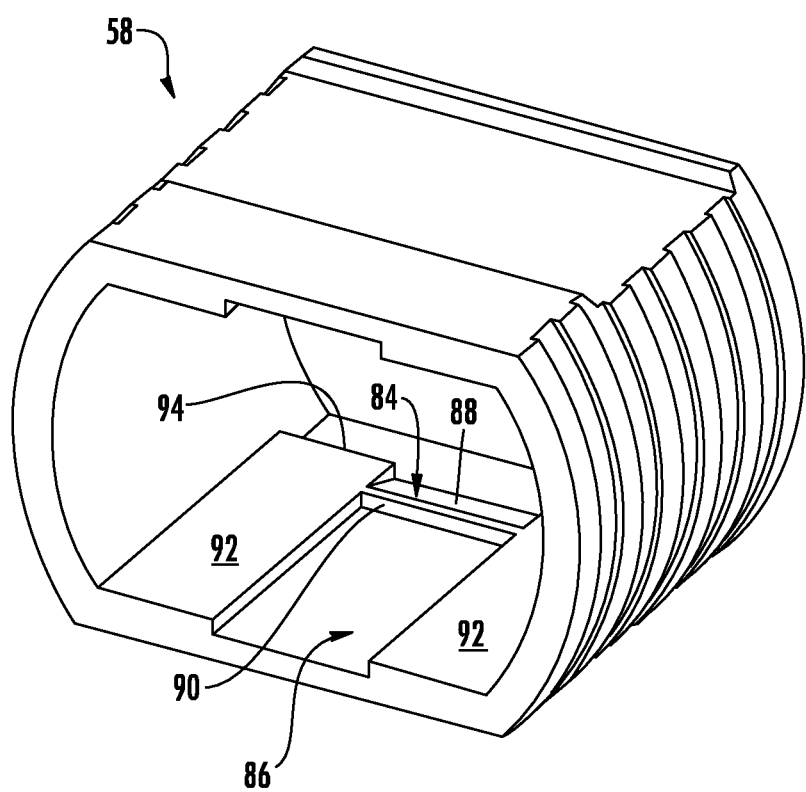
FIG. 8 is an isolated perspective view of the outer slider unit.

Examples of features of the outer slider unit 58 may be understood with reference to FIGS. 3, 7 and 8. Each of the top and bottom walls of the outer slider unit 58 includes a generally ramp-shaped protruding part, which may be referred to as an outer unit ramp protrusion 84, extending inwardly from within or proximate a rear end of an outer unit channel 86. Each outer unit ramp protrusion 84 may include an outer unit inclined surface 88 and an upright surface, which may be referred to as an outer unit forward shoulder 90. Each of the top and bottom walls of the outer slider unit 58 further includes outer unit guide surfaces 92 between which the outer unit channels 86 are respectively positioned. Upright surfaces proximate the rear ends of the outer unit guide surfaces 92 may be referred to as outer unit rear shoulders 94.

Figure 9:
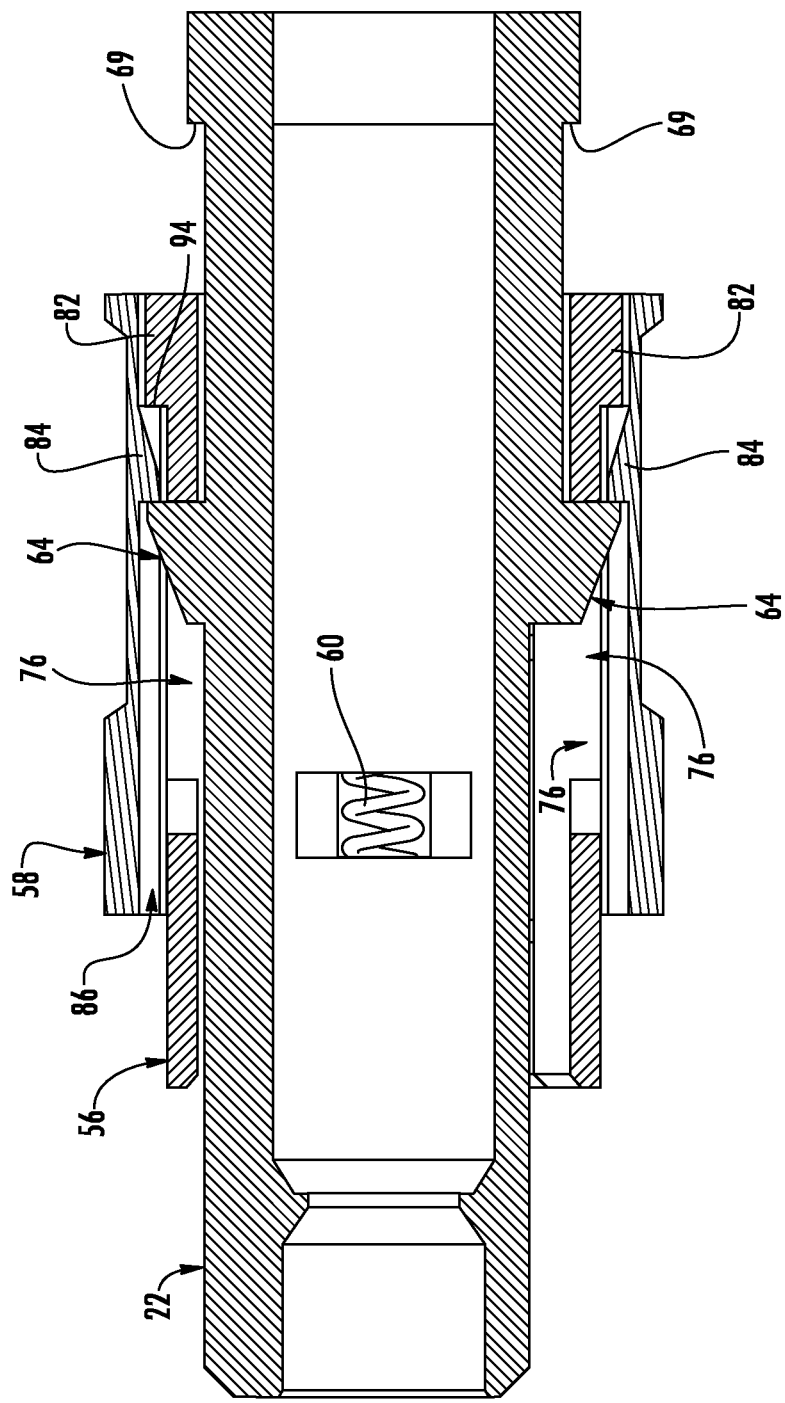
FIG. 9 is a cross-sectional view of the subcombination of FIGS. 3 and 4, wherein the cross section is taken along line 9-9 of FIG. 4.

In the embodiment shown in the drawings, the assembling of the connector 10 includes mounting the slider assembly 12 to the housing 22, as may be understood, for example, with reference to FIG. 9. The mounting of the slider assembly 12 to the housing 22 includes causing relative movement between the inner and outer slider units 56, 58 and housing 22 so that the inner slider unit extends at least partially around the housing and the outer slider unit extends at least partially around the inner slider unit. For example, the inner slider unit 56 may be positioned at least partially around, or more specifically completely around, the housing 22 by way of relative movement, so that the springs 60 are at least partially positioned in the receptacles 62, 72, and the housing ramp protrusions 64 respectively extend through the holes 76 to provide a partially assembled configuration.

With the housing 22 and the inner slider unit 56 in the partially assembled configuration, the outer slider unit 58 may be positioned at least partially around, or more specifically completely around, the inner slider unit by way of relative movement between the outer slider unit and both the inner slider unit and the housing. This relative movement between the inner and outer slider units 56, 58 and housing 22 in a first direction causes the inclined surfaces 66, 88 to engage one another with relative sliding therebetween in a manner that causes relative movement between the ramp protrusions 64, 84 in a second direction that extends crosswise (e.g., substantially perpendicular) to the first direction, so that the outer unit ramp protrusions 84 "snap" over and become at least partially captured rearwardly of the housing ramp protrusions 64, and the outer ends of the housing ramp protrusions 64 respectively extend into the outer unit channels 86. Optionally, the outer unit ramp protrusions 84 may be longer so that they extend at least partially through the holes 76. More generally, one or more of the ramp protrusions 64, 84 may respectively extend at least partially through the holes 76.

More specifically, the outer slider unit 58 may be mounted to the inner slider unit 56 and the housing 22 while the inner slider unit is held in its rearward position in which the rear end of the inner slider unit is engaged against the housing rear shoulders 69, so that the springs 60 are compressed, and the inner unit flanges 82 become positioned rearwardly of the outer unit rear shoulders 94. Then, the slider assembly 12 may be released so that the springs 60 expand and force the inner slider unit 56 to move forwardly into its forward position. As the inner slider unit 56 moves forwardly, the forward shoulders of the inner unit flanges 82 engage the outer unit rear shoulders 94 so that the outer slider unit 58 is carried forward by the inner slider unit until the forward movement of the outer slider unit is arrested when the outer slider unit reaches it forward position. The forward movement of the outer slider unit 58 is arrested when the outer unit forward shoulders 90 engage the housing forward shoulders 68. With the outer slider unit 58 in its forward position, forward movement of the inner slider unit 56 is arrested when the forward shoulders of the inner unit flanges 82 engage the outer unit rear shoulders 94.

FIGS. 1, 4, 9 and 10 show both the inner and outer slider units 56, 58 in their forward positions. Advantageously, when the outer slider unit 58 in its forward position, the inner slider unit 56 is free to be moved between its forward and rearward positions, as will be discussed in greater detail below. More specifically, when the outer slider unit 58 in its forward position, the inner slider unit 56 is free to be reciprocated between forward and rearward stops or stop assemblies. The forward stop assemblies comprise the ramp protrusions 64, 84, the forward shoulders of the inner unit flanges 82, and the outer unit rear shoulders 94. The rearward stop assemblies comprise the rear end surfaces of the inner slider unit 56 and the housing rear shoulders 69.

Figure 4:
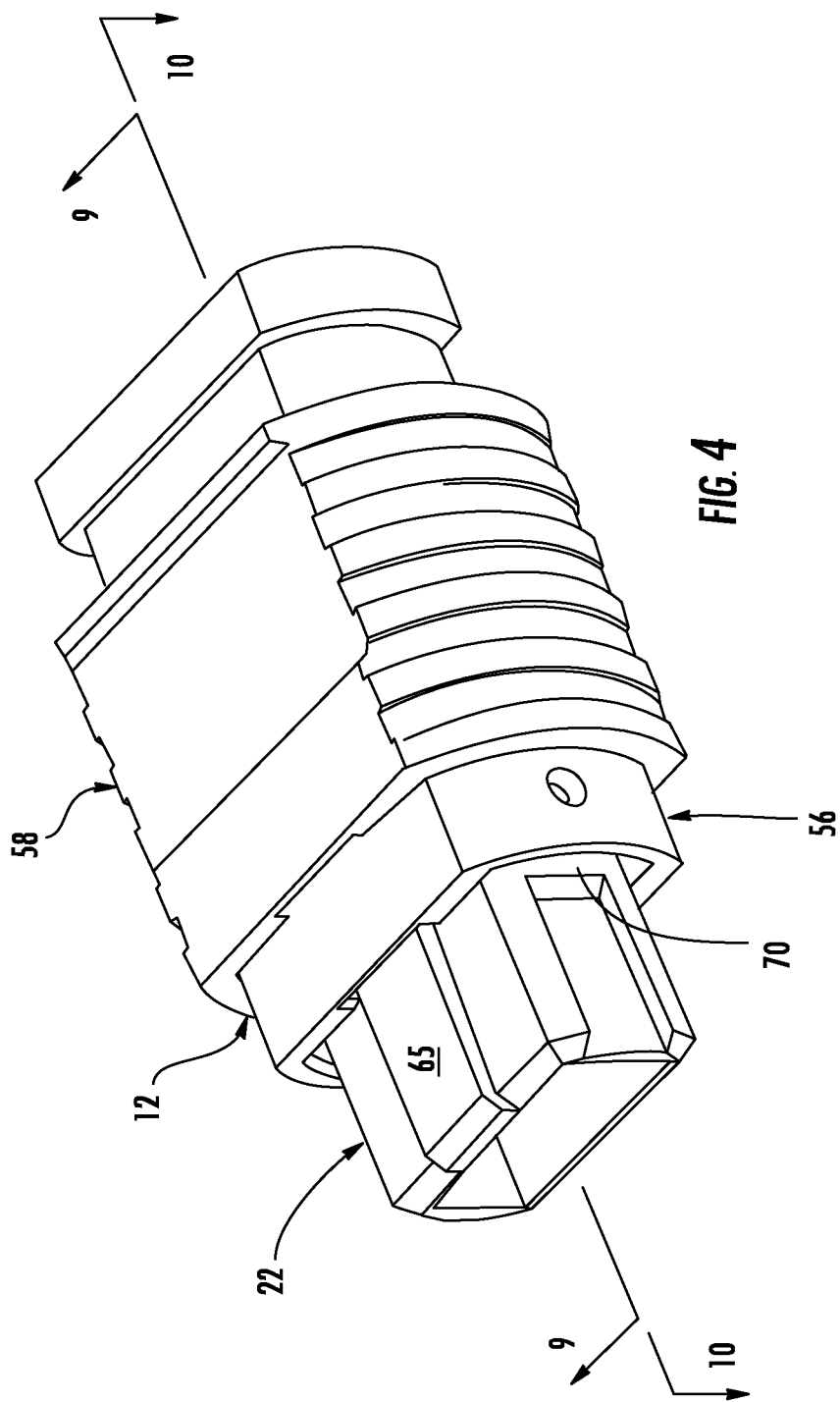
FIG. 4 is a perspective view of the subcombination of FIG. 3 in an assembled configuration.
Figure 10:
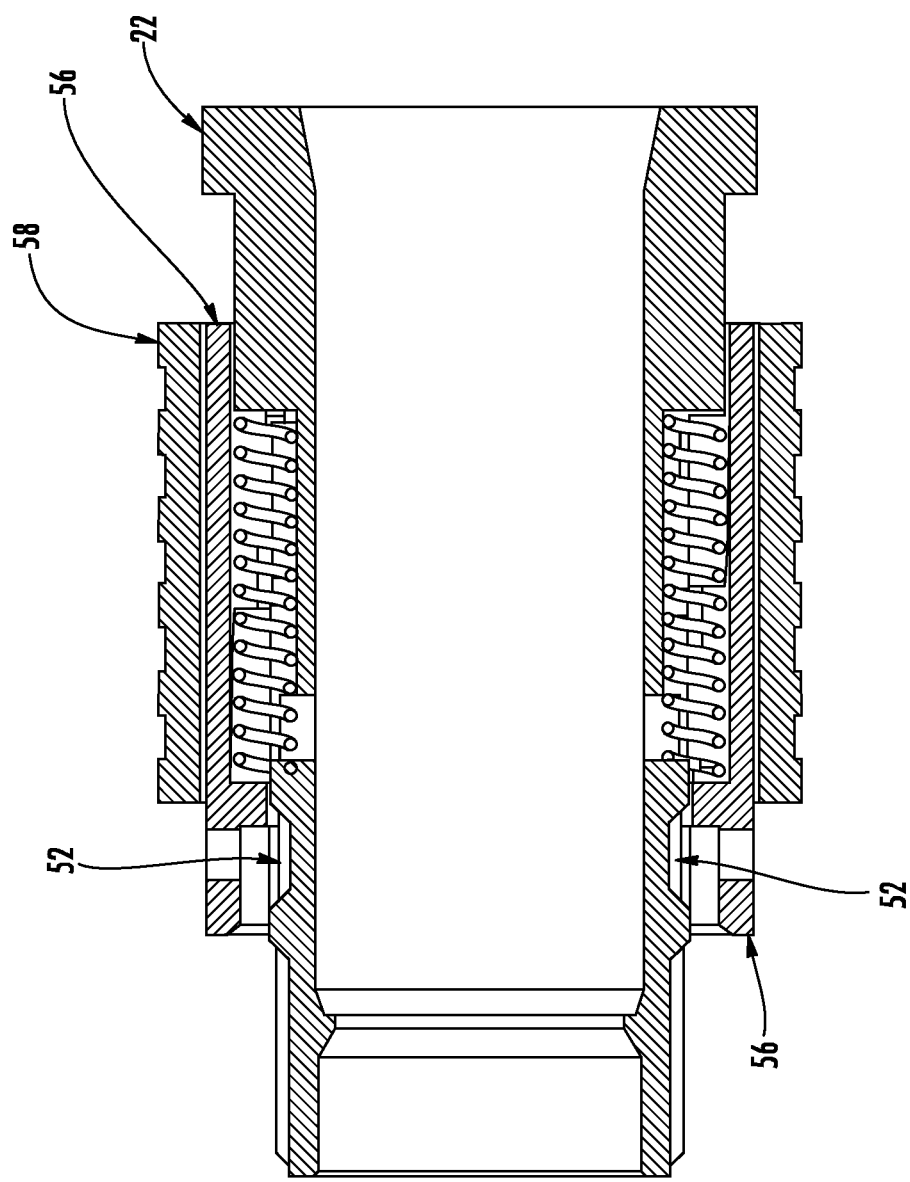
FIG. 10 is a cross-sectional view of the subcombination of FIGS. 3 and 4, wherein the cross section is taken along line 10-10 of FIG. 4.

Referring to FIGS. 4 and 10, when the inner slider unit 56 is in its forward position, forward portions of at least one sidewall of the inner slider unit, or more specifically forward portions of right and left walls of the inner slider unit, respectively at least partially obstruct the latch receptacles 52. In contrast, when the inner slider unit 56 is in its rearward position, forward portions of the at least one sidewall of the inner slider unit, or more specifically forward portions of right and left walls of the inner slider unit, are positioned at least partially rearwardly of the latch receptacles 52 so that the latch receptacles are at least partially unobstructed by the slider assembly 12, as will be discussed in greater detail below.

As mentioned above, the slider assembly 12 advantageously seeks to streamline proper engagement between the connector 10 and a receptacle that may be in the form of the conventional adapter 14 of FIG. 11. The adapter 14 includes cantilevered latches 96 that are positioned proximate a pathway for receiving the front end of the connector 10. Inner ends of the latches 96 are connected to structure of the adapter 14 within the interior of the adapter so that the outer ends of the latches may be moved in a cantilevered manner.

Figure 12:
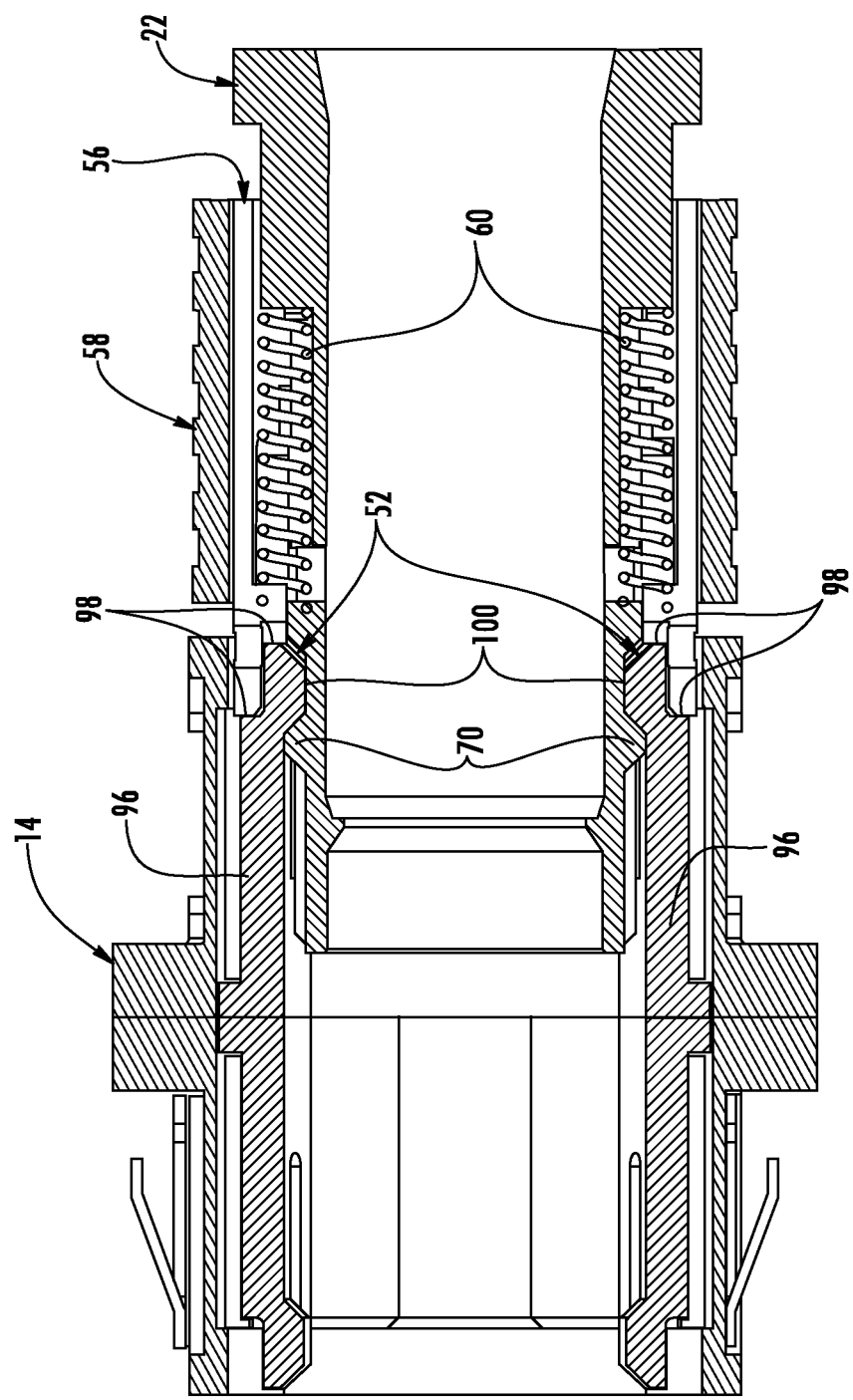
FIG. 12 is a cross-sectional view of the subcombination of FIGS. 3 and 4 installed in the adapter of FIG. 11.

Referring to FIGS. 11 and 12, the front end of the connector 10 may be inserted into the adapter 14 by pushing the front end of the housing 22 into the adapter. The inwardly pushing of the housing 22 into the adapter 14 may be facilitated by pushing the boot 23 (FIGS. 1 and 2). Advantageously, the inwardly pushing of the housing 22 may also or alternatively be facilitated by pushing the outer slider unit 58, since the inner slider unit 56 may reciprocate relative to both the outer slider unit and the housing 22 while the outer slider unit is in its forward position. For example and as best understood with reference to FIG. 12, while the outer slider unit 58 is being pushed and remains in its forward position, shoulders 98 of the latches 96 may engage the front end of the inner slider unit 56 so that the springs 60 are compressed and the inner slider unit moves rearwardly in a first direction so that the latch receptacles 52 become at least partially unobstructed by the inner slider unit, and tabs 100 at the outer ends of the latches 96 move in a direction that extends crosswise (e.g., substantially perpendicular) to the first direction, so that the latch tabs respectively "snap" over and become at least partially captured rearwardly of the catch wedge protrusions 70 in the latch receptacles 52. Then, the pushing may be ceased so that the springs 60 force the inner slider unit 56 into its forward position in which the inner slider unit at least partially obstructs the latch receptacles 52. In this, in which configuration, inner surfaces of the inner slider unit 56 are in opposing face-to-face configuration with (e.g., in opposing face-to-face contact with) side surfaces of the latches 96 in a manner that seeks to prevent (e.g., in a manner that substantially prevents) the latches from becoming unlatched, so that the connector 10 may not be readily disengaged from the adapter 14 without moving the outer slider unit 58 to its rearward position.

When the outer slider unit 58 to pulled to its rearward position, it carries along the inner slider unit 56 to its rearward position as discussed above, so that the latch receptacles 52 are at least partially unobstructed by the slider assembly 12, and as the outer slider unit continues to be pulled the latch tabs 100 respectively "snap" over the catch wedge protrusions 70 to exit the latch receptacles 52 so that the connector 10 is disengaged from the adapter 14. Stated differently, to extract the connector 10 from the adapter 14, the outer slider unit 58 may be pulled backward which also moves the inner slider unit 56 backward against its springs 60 to release the latches 96 so that they flex and cantilever outwardly, and the connector is withdrawn from the adapter.

Figure 13:
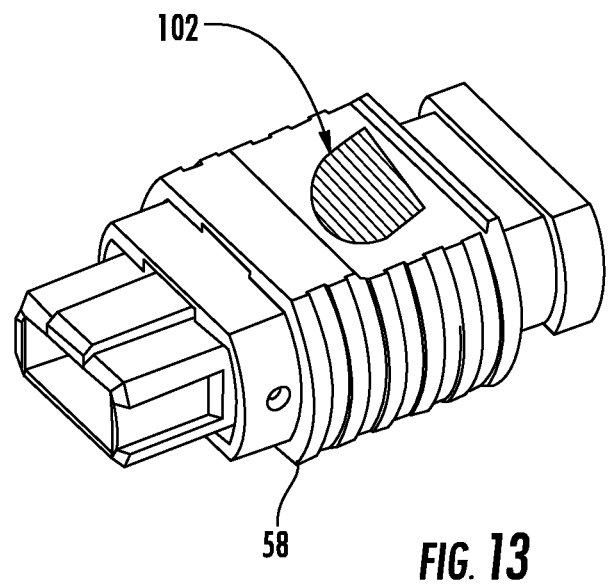
FIG. 13 is a perspective view of a portion of a fiber optic connector in accordance with an embodiment of this disclosure.

Referring to FIG. 13, a series of ridges, serrations and/or the like, which may be referred to as knurling 102, may be present on the outer top and/or bottom surfaces of the outer slider unit 58 in a manner that seeks to direct a user's fingers to the correct surfaces for installation and/or removal of the connector 10. Similarly and referring to FIG. 14, a series of ridges, serrations and/or the like, which may be referred to as knurling 102 may be present on the outer top and/or bottom surfaces of the boot 23 in a manner that seeks to direct a user's fingers to the correct surfaces for installation of the connector 10 (FIGS. 1 and 2) or a connector 110 that, excluding the knurling 102, is not novel per see. That is, the connector 110 of FIG. 14 includes a conventional one-piece slider 112.

Figure 14:
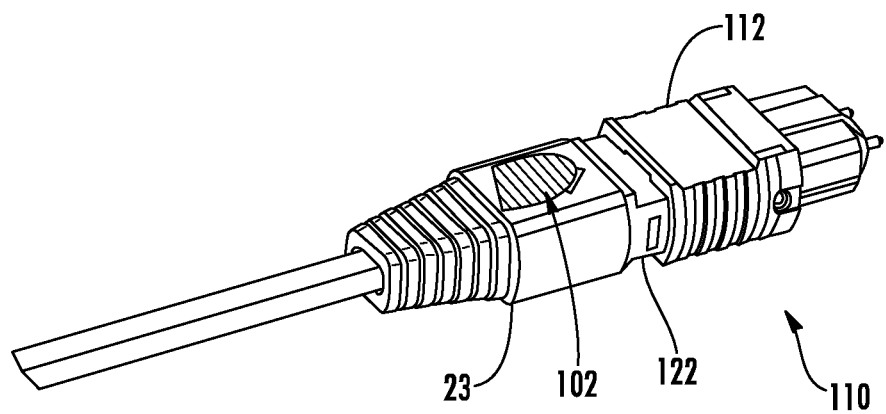
FIG. 14 is a perspective view of a fiber optic cable assembly in accordance with an embodiment of this disclosure.

In contrast to the connector 10 (FIGS. 1 and 2), to attach the connector 110 of FIG. 14 to the adapter 14, the inner housing 122 of the connector 110 must be pushed in order to allow the outer, one-piece slider 112 to move rearward against its springs so that latches of the adapter insert into latch receptacles of the housing 122. If the one-piece slider 112 is accidentally pushed while trying to engage the connector 110 in the adapter 14, the one-piece slider 112 butts against the latches and prevents insertion of the latches into the latch receptacles of the housing 122, which prevents proper engagement (e.g., latching) between the connector 110 and the adapter.

Persons skilled in optical connectivity will appreciate additional variations and modifications of the devices and methods already described. Additionally, where a method claim below does not explicitly recite a step mentioned in the description above, it should not be assumed that the step is required by the claim. Furthermore, where a method claim below does not actually recite an order to be followed by its steps or an order is otherwise not required based on the claim language, it is no way intended that any particular order be inferred.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A fiber optic connector configured to be inserted into an adapter that includes adapter latches, the fiber optic connector comprising:
   a ferrule having a front end face and a plurality of bores extending into the ferrule from the front end face;
   a housing received over the ferrule, wherein the housing includes left and right sides each having a latch receptacle for receiving at least a portion of one of the adapter latches; and
   a slider assembly mounted to the housing, the slider assembly comprising:
     an inner slider unit configured to move relative to the housing between a forward inner slider position defined by an inner slider forward stop assembly formed by the housing and the slider assembly and a rearward inner slider position defined by an inner slider rearward stop assembly formed by the housing and the slider assembly, wherein the inner slider unit at least partially obstructs the latch receptacles on the left and right sides of the housing when the inner slider unit is in the forward inner slider position, and the latch receptacles are less obstructed or completely unobstructed by the inner slider unit when the inner slider unit is in the rearward inner slider position; and an outer slider unit configured to move relative to the housing between a forward outer slider position defined by an outer slider forward stop assembly formed by the housing and the slider assembly and a rearward outer slider position defined by a forward stop assembly formed by the housing and the slider assembly;

wherein the slider assembly is configured such that when the outer slider unit is in the forward outer slider position defined by the outer slider forward stop assembly, the inner slider unit is free to reciprocate between the forward inner slider position defined by the inner slider forward stop assembly and the rearward inner slider position defined by the inner slider rearward stop assembly.

2. The fiber optic connector of claim 1, wherein the inner slider unit is movable relative to the housing and the outer slider unit when the outer slider unit is in the forward outer slider position defined by the outer slider forward stop assembly.

3. The fiber optic connector of claim 1, further comprising at least one spring for forwardly biasing the inner slider unit relative to the housing.

4. The fiber optic connector of claim 1, wherein:
the inner slider unit extends at least partially around the housing, and
the outer slider unit extends at least partially around the inner slider unit, so that the inner slider unit is positioned between the housing and the outer slider unit.

5. The fiber optic connector of claim 4, wherein the inner and outer forward stop assemblies are configured such that:
forward movement of the outer slider unit is restricted by the housing, and
forward movement of inner slider unit is restricted by the outer unit.

6. The fiber optic connector of claim 4, wherein:
the inner unit comprises at least one sidewall extending at least partially around the housing; and
a hole extends through the sidewall.

7. The fiber optic connector of claim 6, wherein a part extends at least partially into the hole, and the part is selected from the group consisting of a part of the housing and a part of the outer slider unit.

8. The fiber optic connector of claim 6, wherein:
the housing includes an outwardly extending protrusion extending at least partially into the hole;
the outer slider unit includes an inwardly extending protrusion; and
the outwardly and inwardly extending protrusions are cooperative with one another for restricting forward movement of the outer slider unit relative to the housing in response to the outer slider unit being in the forward outer slider position.

9. The fiber optic connector of claim 8, wherein the inner and outer slider units are cooperative with one another for restricting forward movement of the inner slider unit relative to the outer slider unit in response to the inner and outer slider units simultaneously being in their forward positions.

10. The fiber optic connector of claim 1, wherein the latch receptacles each comprise a hole in the housing.

11. The fiber optic connector of claim 1, wherein the latch receptacles each comprise an outwardly protruding shoulder of the housing.

12. A fiber optic cable assembly configured to be inserted into an adapter that includes adapter latches, the fiber optic cable assembly comprising:
a cable including a plurality of optical fibers; and
a fiber optic connector mounted on the cable, the fiber optic connector comprising:
a ferrule having a front end face and a plurality of bores extending into the ferrule from the front end face, wherein the plurality of optical fibers are secured in the plurality of bores;
a housing received over the ferrule, wherein the housing includes left and right sides each having a latch receptacle for receiving at least a portion of one of the adapter latches; and
a slider assembly mounted to the housing, the slider assembly comprising:
an inner slider unit configured to move relative to the housing between a forward inner slider position defined by an inner slider forward stop assembly formed by the housing and the slider assembly and a rearward inner slider position defined by an inner slider rearward stop assembly formed by the housing and the slider assembly, wherein the inner slider unit at least partially obstructs the latch receptacles on the left and right sides of the housing when the inner slider unit is in the forward inner slider position, and the latch receptacles are less obstructed or completely unobstructed by the inner slider unit when the inner slider unit is in the rearward inner slider position; and
an outer slider unit configured to move relative to the housing between a forward outer slider position defined by an outer slider forward stop assembly formed by the housing and the slider assembly and a rearward outer slider position defined by a forward stop assembly formed by the housing and the slider assembly;
wherein the slider assembly is configured such that when the outer slider unit is in the forward outer slider position defined by the outer slider forward stop assembly, the inner slider unit is free to reciprocate between the forward inner slider position defined by the inner slider forward stop assembly and the rearward inner slider position defined by the inner slider rearward stop assembly.

13. A method for at least partially assembling a fiber optic connector, comprising:
securing a plurality of optical fibers to a ferrule;
positioning the ferrule within a housing so that the ferrule extends beyond a front end of the housing;
movably mounting a slider assembly to the housing so that
an inner slider unit of the slider assembly is configured to move relative to the housing between a forward inner slider position defined by an inner slider forward stop assembly formed by the housing and the slider assembly and a rearward inner slider position defined by an inner slider rearward stop assembly formed by the housing and the slider assembly, wherein the inner slider unit at least partially obstructs the latch receptacles on the left and right sides of the housing when the inner slider unit is in the forward inner slider position, and the latch receptacles are less obstructed or completely unobstructed by the inner slider unit when the inner slider unit is in the rearward inner slider position, an outer slider of the slider assembly is configured to move relative to the housing between a forward outer slider position defined by an outer slider forward stop assembly formed by the housing and the slider assembly and a rearward outer slider position defined by a forward stop assembly formed by the housing and the slider assembly, and the slider assembly is configured such that when the outer slider unit is in the forward outer slider position defined by the outer slider forward stop assembly, the inner slider unit is free to reciprocate between the forward inner slider position defined by the inner slider forward stop assembly and the rearward inner slider position defined by the inner slider rearward stop assembly.

14. A fiber optic connector configured to be inserted into an adapter that includes adapter latches, the fiber optic connector comprising:

a ferrule having a front end face and a plurality of bores extending into the ferrule from the front end face;

a housing received over the ferrule, wherein the housing includes left and right sides each having a latch receptacle for receiving at least a portion of one of the adapter latches; and a slider assembly mounted to the housing, wherein:

the slider assembly comprises a first unit and a second unit;

the first unit is configured to move relative to the housing between a forward position and a rearward position, wherein the first unit at least partially obstructs the latch receptacles on the left and right sides of the housing when the first unit is in its forward position, and the latch receptacles are less obstructed or completely unobstructed by the first unit when the first unit is in its rearward position;

the second unit is configured to move relative to the housing between a forward position and rearward position;

the slider assembly is configured so that the first unit is movable relative to both the housing and the second unit;

the first unit is an inner unit extending at least partially around the housing, and the second unit is an outer unit extending at least partially around the inner unit, so that the inner unit is positioned between the housing and the outer unit;

the first unit comprises at least one sidewall extending at least partially around the housing and a hole extends through the sidewall;

the housing includes an outwardly extending protrusion extending at least partially into the hole;

the second unit includes an inwardly extending protrusion and the outwardly and inwardly extending protrusions are cooperative with one another for restricting forward movement of the second unit relative to the housing in response to the second unit being in its forward position; and the first unit is free to be reciprocated between forward and rearward stop assemblies, the forward stop assemblies comprise the outwardly extending protrusions of the housing.

* * * * *